US010237028B2

(12) United States Patent
Göransson et al.

(10) Patent No.: US 10,237,028 B2
(45) Date of Patent: Mar. 19, 2019

(54) METHOD AND ARRANGEMENT FOR INTER-CELL INTERFERENCE COORDINATION USING PRECODING/BEAMFORMING

(71) Applicant: TELEFONAKTIEBOLAGET L M ERICSSON (PUBL), Stockholm (SE)

(72) Inventors: Bo Göransson, Sollentuna (SE); Lars Lindbom, Karlstad (SE); Panagiota Lioliou, Sundbyberg (SE); Dirk Gerstenberger, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/914,216

(22) PCT Filed: Sep. 3, 2013

(86) PCT No.: PCT/SE2013/051027
§ 371 (c)(1),
(2) Date: Feb. 24, 2016

(87) PCT Pub. No.: WO2015/034402
PCT Pub. Date: Mar. 12, 2015

(65) Prior Publication Data
US 2016/0211954 A1   Jul. 21, 2016

(51) Int. Cl.
*H04L 5/00* (2006.01)
*H04B 7/024* (2017.01)
*H04W 72/04* (2009.01)
*H04B 7/0456* (2017.01)
*H04B 7/06* (2006.01)
(Continued)

(52) U.S. Cl.
CPC .......... *H04L 5/0032* (2013.01); *H04B 7/024* (2013.01); *H04B 7/0456* (2013.01); *H04B 7/0626* (2013.01); *H04B 7/0639* (2013.01); *H04W 24/08* (2013.01); *H04W 52/244* (2013.01);
(Continued)

(58) Field of Classification Search
None
See application file for complete search history.

(56) References Cited

U.S. PATENT DOCUMENTS 9,713,101 B2 *   7/2017   Wang ................. H04W 52/244
2010/0054196 A1 *   3/2010   Hui ....................... H04W 16/00
370/329
(Continued)

*Primary Examiner* — Mohammad S Adhami
(74) *Attorney, Agent, or Firm* — Sage Patent Group

(57) ABSTRACT

Network nodes and methods therein for inter cell interference coordination. A method in a base station BS1 comprises receiving, from a neighboring base station BS2, an indicator A, related to estimated spatial properties of a radio channel over which the neighboring base station has received a radio signal from the base station BS1. The method further comprises receiving, from a UE served by the base station, an indicator B related to estimated spatial properties of a radio channel over which the UE has received a radio signal from the base station BS1. The method further comprises determining a correlation based on indicator A and indicator B; and adapting a transmission to the UE, based on properties of the correlation. By performing the method, the base station BS1 enables control of interference subjected towards the neighboring base station BS2 caused by downlink transmission to the UE.

6 Claims, 9 Drawing Sheets

(51) Int. Cl.
*H04W 24/08* (2009.01)
*H04W 52/24* (2009.01)
*H04W 72/12* (2009.01)

(52) U.S. Cl.
CPC ... *H04W 72/0426* (2013.01); *H04W 72/1231* (2013.01); *H04W 72/1226* (2013.01)

(56) References Cited

U.S. PATENT DOCUMENTS

| | | | | |
|---|---|---|---|---|
| 2013/0114524 | A1* | 5/2013 | Sirotkin | H04L 1/0026 370/329 |
| 2013/0115999 | A1* | 5/2013 | Sirotkin | H04B 7/0617 455/522 |
| 2013/0194982 | A1* | 8/2013 | Fwu | H04W 72/0493 370/280 |
| 2013/0235807 | A1* | 9/2013 | Lee | H04W 16/28 370/329 |

* cited by examiner

METHOD AND ARRANGEMENT FOR INTER-CELL INTERFERENCE COORDINATION USING PRECODING/BEAMFORMING

This application is a 371 of International Application No. PCT/SE2013/051027, filed Sep. 3, 2013, the disclosure of which is fully incorporated herein by reference.

TECHNICAL FIELD

The solution described herein relates generally to Inter-Cell Interference Coordination ICIC, and in particular to ICIC in wireless communication systems applying multiple transmit antennas and precoding/beam forming.

BACKGROUND

In order to meet higher capacity demands and higher user experiences, heterogeneous networks (hetnets) are considered as an important complement to densification of macro networks. Heterogeneous networks can be characterized as deployments with a mixture of macro cells and small cells with overlapping coverage areas. One example of such deployments is where small, so-called pico cells are deployed within the coverage area of larger macro cells to offload macro traffic and to provide higher bitrates by reducing the distance between users and the serving base station. A pico base station is an example of a low power node (LPN) transmitting with low output power, as compared to a high power node, and thus typically covers a much smaller geographical area than a high power node, such as a macro base station.

Small cells and macro cells can be deployed on same frequency or on separate frequencies. In scenarios with co-channel deployments, i.e. small cells operate on the same frequencies as the macro cells, there will be a link imbalance in best cell association for downlink (DL) and uplink (UL) transmissions. Typically, a UE will associate to the strongest cell, i.e. to the cell with the highest received DL power, which means that the DL coverage area is dominated by the macro cell. In the UL, however, the "best" cell is usually determined by lowest path loss. Hence, there will be a mismatch between the "best" cell for UL and DL transmissions as illustrated in FIG. 1. To some extent this can be alleviated by adding a bias term when cell association is done. By biasing the DL measurements, the network can associate a UE to a LPN even if the measured power is higher from the macro cell (HPN). By this, the coverage area of the LPN is increased, hence the term "range expansion". Cellular networks like 3GPP LTE have been designed for operations with a certain amount of range expansion (handover bias) which may, however, not be sufficient to achieve efficient operations of heterogeneous deployments with large power differences between LPNs and high power nodes.

One challenge associated with range expansion is the coverage of DL physical control channels transmitted from the LPN in the small cells, as reliable reception of the physical control channels is essential for data communications. In LTE, the Physical Downlink Control Channel (PDCCH) or/and the enhanced PDCCH (ePDCCH) carry the DL control information needed by a UE to receive and transmit data. With large range expansion, the inter-cell interference (ICI) from the macro cells could be excessively severe and prevent reliable detection of these control channels. A solution to this could be to introduce almost blank subframes (ABS) or reduced power subframes (RPSF), where UE specific transmissions in certain subframes from the macro node are either muted or transmitted with lower power. By this, the probability of detecting physical control channels will increase.

The principle of ABS/RPSF is illustrated in FIG. 1b. In this case an interfering macro cell mute or reduce transmission power on data to macro users in certain subframes, in order to create protected radio resources for the pico cell. The macro base station indicates via the LTE inter-node interface X2 to the neighbor pico base station the subframes it intends to mute or reduce transmit power. The pico base station can then take this information into account when scheduling users operating within the cell range expansion zone; such that these users are prioritized to be scheduled in protected subframes, i.e. low interference subframes. Pico users operating near the pico base station may in principle be scheduled in all subframes. One may notice that ABS/RPSF assumes that pico cells are time synchronized to the macro cell, as a request for creating protected subframes.

However, a consequence of applying ICIC schemes like ABS/RPSF is the reduced capacity of the cooperating macro cells. Some investigations show that the net gain of introducing ABS/RPSF can be very small, or in some scenarios it actually reduces the overall system capacity.

SUMMARY

It would be desirable to reduce ICI, subjected e.g. to UEs in small cells in hetnet deployments, without introducing a capacity loss as the one associated with previously known solutions.

According to a first aspect, a method is provided, to be performed by a base station, BS1, which is operable to apply multiple antenna transmission and precoding/beam forming, and which is further operable to serve a number of UEs in a wireless communication system. The method comprises receiving, from a neighboring base station BS2, an indicator A, related to estimated spatial properties of a radio channel over which the neighboring base station has received a radio signal from the base station BS1. The method further comprises receiving, from a UE served by the base station, an indicator B related to estimated spatial properties of a radio channel over which the UE has received a radio signal from the base station BS1. The method further comprises determining 304 a correlation based on indicator A and indicator B; and adapting 305 a transmission to the UE, based on properties of the correlation.

According to a second aspect, a method is provided to be performed by a base station, BS2. The method comprises receiving a signal from BS1. The method further comprises determining an indicator A, based on the received signal. The indicator A is related to estimated spatial properties of a channel between the neighboring base station BS1 and the base station BS2. The method further comprises transmitting 403 the indicator A to the neighboring base station BS1. This enables BS1 to control interference subjected towards BS2.

According to a third aspect, a base station, BS1, is provided. The base station is operable in a wireless communication network and further operable to apply multi-antenna transmission and precoding/beam forming, and to serve a number of UEs. The base station comprises processing means and a memory for storing instructions, the memory comprising instructions which when executed by the processing means causes the arrangement to receive, from a neighboring base station BS2, an indicator A, related to estimated spatial properties of a radio channel over which the neighboring base station has received a radio signal from the base station BS1; and further to receive, from a UE served by the base station, an indicator B related to estimated spatial properties of a radio channel over which the UE has received a radio signal from the base station BS1. The execution of the instructions further causes the arrangement to determine a correlation based on indicator A and indicator B; and to adapt a transmission to the UE, based on properties of the correlation. The execution of the instructions could further cause the arrangement to transmit to the UE according to the adaptation.

According to a fourth embodiment, a base station, BS2, is provided. The base station comprises processing means and a memory for storing instructions, the memory comprising instructions which when executed by the processing means causes the arrangement to receive a radio signal from a neighboring base station BS1; and to determine, based on the received signal, an indicator A related to estimated spatial properties of a channel between the neighboring base station BS1 and the base station BS2. The execution of the instructions further causes the arrangement to transmit the indicator A to the neighboring base station BS1.

One advantage with the proposed methods and base stations is that they enable that only a subset of the UEs in a cell are scheduled with reduced transmit power e.g. in certain "low interference subframes". Users which are not located in the direction towards a victim node can be served with higher or full power. For example, if a PMI is used to indicate the direction of the victim node relative to the serving node, all users reporting a different PMI can be served with higher or full power.

Another advantage of the proposed method is that high and low power nodes in a hetnet deployment may not need to be time synchronized.

Further, according to embodiments of the solution, there is no need to know in which actual geographical direction a neighboring base station and/or a UE is located.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Within this description, mainly LTE terminology will be used when explaining the principles of the solution presented herein. However, the solution is also applicable in wireless communication systems operating according to other standards, which apply multiple antenna transmission and precoding/beam forming.

Some examples herein will be described in a hetnet scenario, where interference is caused by a high power node, denoted e.g. "macro" node/cell, to a Low Power Node (LPN), denoted e.g. "pico" node/cell. The high power node may also be referred to as the "aggressor" node, and the LPN may also be referred to as the "victim" node. However, the solution is also applicable in scenarios with neighboring nodes of other power relation, e.g. nodes of equal power. In the description, one of the nodes will also be denoted BS1 and the other BS2, where BS1 could be a high power node and BS2 could be a LPN, or BS1 and BS2 could have other power relations.

Figure 1A:
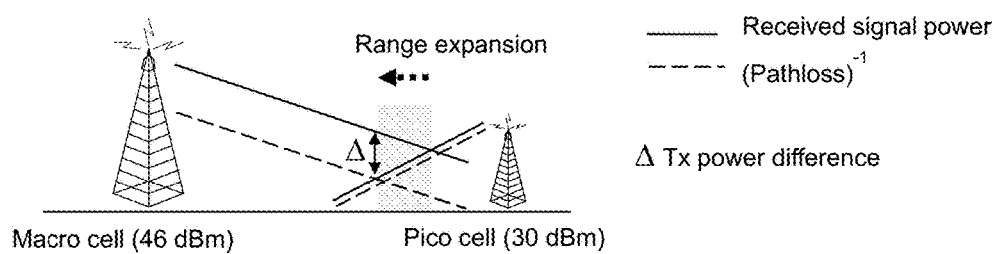
FIG. 1a illustrates range expansion in heterogeneous deployments, according to the prior art.
Figure 1B:
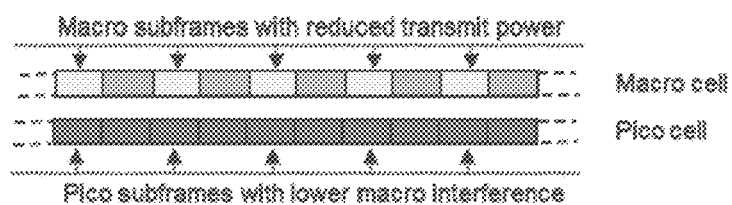
FIG. 1b illustrates the concept of reduced power subframes, according to the prior art.

In a heterogeneous network deployment, as previously mentioned, the interference situation is very different in uplink (UL) and downlink (DL). The DL coverage area of a high power node may overlap considerably with the UL coverage area of a LPN. This effect is usually referred to as cell range expansion and is depicted in FIG. 1. One way to combat the negative effects from range expansion is to introduce ABSF (almost blank subframes) or RPSF (reduced power subframes), in which the high power node (macro) can reduce the transmitted power of certain subframes. By this, a terminal can be served by the LPN for which the UL is strongest. One drawback with ABSF/RPSF is the loss in capacity that a "silent" subframe will provide. Since no user can be scheduled, or if a user is scheduled, the power for this subframe will be very low (RPSF).

Figure 2:
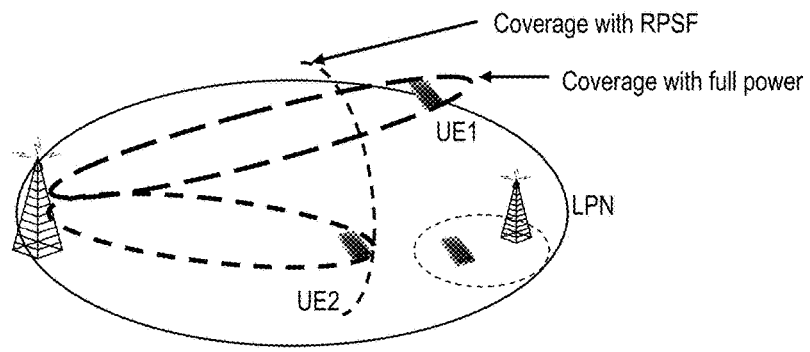
FIG. 2 illustrates spatial reuse with reduced power subframes, according to an exemplifying embodiment.

However, this problem could be avoided if users which are well separated, in the spatial domain, from the LPN were scheduled with high power and only users for which a transmission would interfere with the LPN were scheduled with lower power. This is illustrated in FIG. 2, where it can be seen that a UE which is spatially separated from the LPN can be served by high power, and thus the capacity loss associated with conventional use of techniques such as ABS or RPSF could be avoided.

A UE operating in connected mode can be requested, by the serving base station, to perform channel state information (CSI) measurements and provide CSI reports. When applying precoding/beamforming, a CSI report may comprise e.g. a suitable rank indicator (RI), one or more precoding matrix indices (PMIs) and a channel quality indicator (CQI). Other types of CSI are also conceivable including explicit channel feedback and interference covariance feedback. With the feedback, the base station can decide upon a certain transmission scheme as well as on a proper user bit rate for the transmission when scheduling the user in downlink. In LTE, both periodic and aperiodic CSI reporting is supported. In the case of periodic CSI reporting, the terminal reports the CSI measurements on a configured periodical time basis on the physical uplink control channel (PUCCH), whereas with aperiodic reporting the CSI feedback is transmitted on the physical uplink shared channel (PUSCH) at pre-specified time instants after receiving the CSI grant from the base station. With aperiodic CSI reports, the base station can thus request CSI reflecting downlink radio conditions in a particular subframe.

However, no information is received from neighboring base stations on how a signal transmitted from a base station is received at said neighboring base stations. Herein, functionality for receiving signals from other base stations is added to a base station, in order to enable reporting of spatial properties of a radio channel e.g. to a macro base station.

By assuming that the spatial properties of the radio channels between an aggressor high power node and corresponding victim LPNs are known by the aggressor high power node, it would be possible to only reduce the power, as in RPSF, for UEs associated with similar spatial properties as an LPN. As an alternative to reducing the power, UEs with similar spatial properties could be served from the high power node using a down-tilted antenna pattern which effectively limits the range of the transmission.

However, when scheduling users with other spatial properties full transmit power, or at least a higher transmit power than considered for RPSF, can be used since the main bulk of the power would be directed towards another direction. With reference to FIG. 2, we can see that UE2 is located in the same direction from the macro node as the LPN. Hence, when this user is served a transmit power as in RPSF is needed, while UE1 can be served with full transmit power since it is located in another direction than the LPN.

By realizing that direction is tightly coupled with the choice of precoder matrix indicator (PMI) performed by a UE in LTE, the PMI or corresponding information, can be used to discriminate between users. Thus, the transmit power on data from the aggressor node to a user, and/or its antenna tilting, may then depend on the PMI, or corresponding information, associated with the user.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Exemplifying embodiments of a method performed by a base station will now be described with reference to FIG. 3a. The base station, denoted BS1 in the example, is operable to apply multiple antenna transmission and precoding/beam forming, and is operable to serve a number of UEs in a wireless communication system.

Figure 3A:
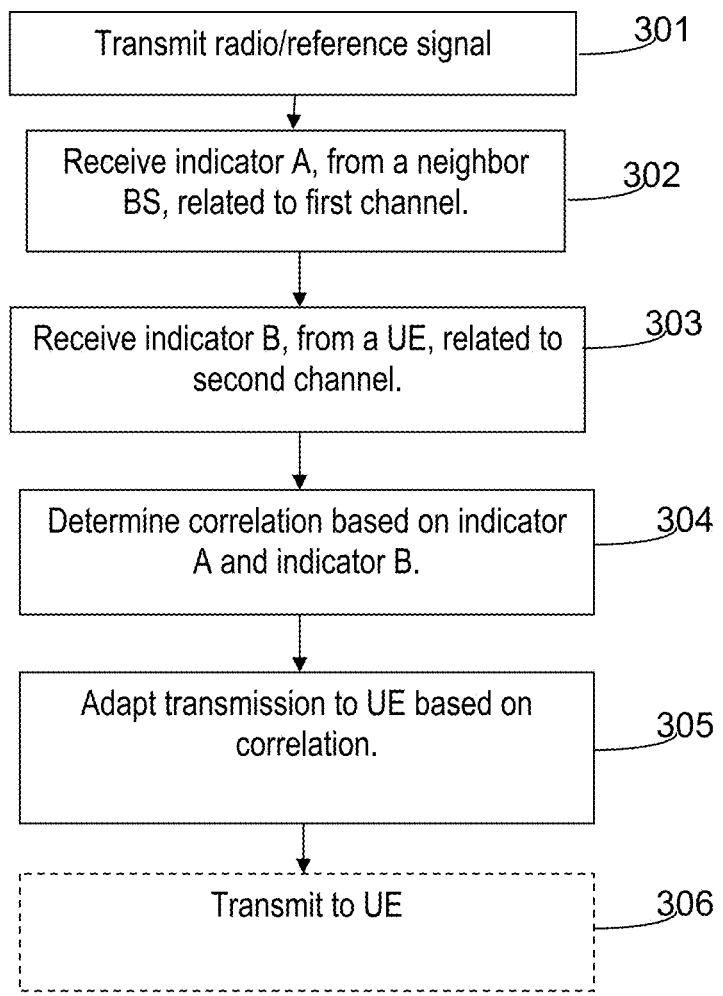
FIGS. 3a and 3b illustrate procedures in a first base station BS1, according to exemplifying embodiments.

FIG. 3a illustrates the method comprising receiving 302, from a neighboring base station BS2, an indicator A, related to estimated spatial properties of a radio channel over which the neighboring base station has received a radio signal from the base station BS1. The method further comprises receiving 303, from a UE served by the base station, an indicator B related to estimated spatial properties of a radio channel over which the UE has received a radio signal from the base station BS1. The method further comprises determining 304 a correlation based on indicator A and indicator B; and adapting 305 a transmission to the UE, based on properties of the correlation. FIG. 3 also shows the action transmitting 306 to the UE according to the adaption. This action could alternatively be considered to be part of action 305. By performing the method, the base station BS1 enables control of interference subjected towards the neighboring base station BS2 caused by downlink transmission to the UE, which is highly beneficial.

The method could be said to start with that BS1 transmits a signal, or type of signal, which may be received by neighboring base stations and UEs served by BS1. This could be a broadcast signal, which is transmitted by BS1 e.g. at certain intervals. The neighboring BS2 may receive one transmission from BS1, and a UE may receive another transmission from BS1, or both BS2 and the UE may receive the same signal/transmission at approximately the same point in time. The signal or signals transmitted from BS1 may be a reference signal or a type of reference signal, which is known to the neighboring base station BS2 and to the UE. The transmitted signal "S" propagates through air, and reaches the BS2 and/or the UE as a signal "S", which is the original signal affected by a channel. The signal could be a regular reference signal provided to enable UEs in the cell to perform e.g. CSI measurements. For example, a signal received by the UE may be denoted $S'_{UE}$ and a signal received by the neighboring base station BS2 may be denoted $S'_{BS2}$.

The UE and BS2 can perform channel measurements based on the received signal, and estimate properties of the channel based on S and S'. The estimated spatial properties, or a measure or value derived there from, such as a PMI, may then be reported back to the base station BS1, which receives these reports in actions 302 and 303. The indicators or reports A and B may have different forms, which will be described further below. The determining of a correlation based on the indicators A and B may be performed in different ways, which will be described further below. The adaptation of a transmission to the UE may also be performed in different ways, which will be described further below.

The respective indicators A and B, which may alternatively be denoted e.g. "reports" or "feedback" may comprise different information. In the most general terminology, the indicator comprises information on spatial characteristics. This could be explicit measurement results or e.g. a quantized value associated with channel properties. In a more specified case, the indicators may comprise a CSI, or be referred to as comprising a PMI (a PMI could be part of CSI). Again, this is mainly LTE terminology, but the terms could be replaced with corresponding names on the corresponding reports in other radio access technologies. The indicators from the BS2 and the UE may comprise or indicate different information. For example, the indicator A from BS2 could comprise explicit channel information, and the indicator B from the UE may comprise a PMI.

Depending on the form of the different reports, the determining of a correlation based on the reports may be performed in different ways. If both reports, A and B comprises a respective PMI, e.g. PMI_A corresponding to a precoder matrix PM_A and PMI_B corresponding to a precoder matrix PM_B, a correlation between PMI_A and PMI_B could be determined by use of a suitable method therefore. Alternatively, a correlation between PM_A and PM_B could be determined. When the indicators comprise channel information on different forms, e.g. one comprises a PMI and one comprises explicit channel parameters, a PMI corresponding to the explicit channel parameters could be determined, and a correlation between the reported PMI and the determined PMI may be determined. If both indicator A and indicator B comprises e.g. explicit channel parameters, Par_A and Par_B, a correlation between these channel parameters could be determined.

The adapting of a transmission to the UE may comprise e.g. selection of, or determining of, a transmission parameter, where the selection or determining is based on the determined correlation. For example, one or more of: a transmission power; a downlink transmission [vertical] tilt; a subframe or subframe category; and/or a precoder matrix could be selected or determined for transmission to the UE.

Figure 3B:
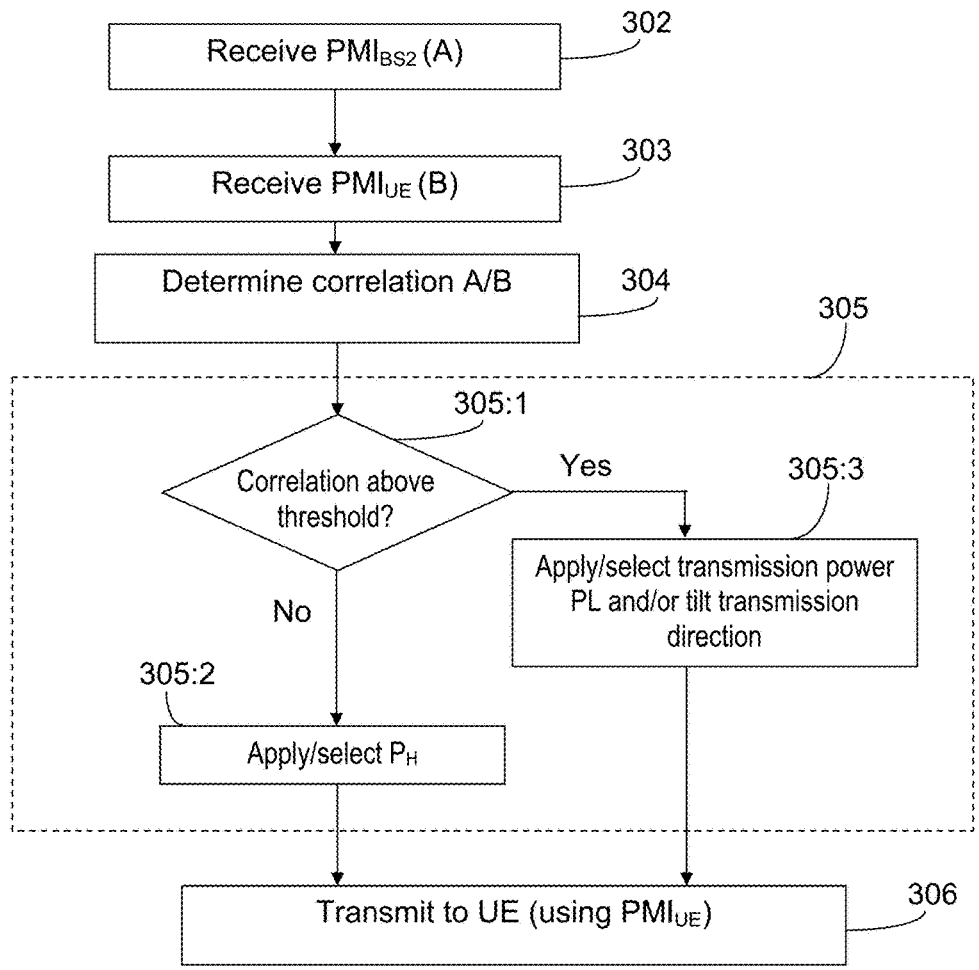

The adapting may comprise comparing the determined correlation to a threshold and performing different actions depending on the result of the comparison. Such comparison is illustrated in FIG. 3b as an action 305:1. For example, when the correlation exceeds a threshold, this may imply e.g. that there is an unacceptable correlation between the channel to the UE and the channel to the BS2, which would lead to that a transmission to the UE using a certain PM would cause an unacceptable interference to the neighboring base station BS2 due to the similarity (high correlation) between the channel characteristics.

There may be certain subframes, or a certain category of subframes, in which the BS1 is obliged to keep its interference towards a neighboring node within predefined limits. The interference allowed in such subframes may be lower than the interference allowed in other, normal or regular subframes or subframe categories (cf. the previously described concept of ABS and RPSF). As previously explained, the neighboring BS2 may utilize such low interference subframes for transmitting control information or similar to UEs e.g. near a cell border.

When the correlation exceeds a threshold implying a certain interference, as described above, the method may comprise selecting not to schedule the UE or transmit to the UE in a subframe category associated with special interference restrictions, but instead in a subframe or subframe category where a higher interference may be tolerated. The expression "to exceed a threshold" is also considered to cover fulfillment of other types of decision criteria. Subframes associated with special interference restrictions, e.g. lower interference than regular subframes, will henceforth be referred to as a subframe category C. Such a selection of subframe may also be expressed as refraining from scheduling the UE in a subframe category C.

Alternatively, the UE may be scheduled in a subframe category C, e.g. in a low power subframe using a PM corresponding to the indicator B, even though the correlation exceeds a threshold. In such cases, one or more other measures may be taken to avoid subjecting the neighboring BS2 to interference above an interference limit. One such measure or action may be applying a transmission power $P_L$ for a transmission to the UE, when scheduled in the subframe category C, wherein the transmission power $P_L$ is lower than a regular transmission power. By regular transmission power is here meant a power which is used for transmission e.g. in another subframe category, or a transmission power used for transmission with another PM, which is less correlated with a PM_A corresponding to indicator A than a PM_B used for transmission to the UE. This alternative of a applying $P_L$ is illustrated in FIG. 3b as action 305:3

Another such measure may be applying a transmission direction vertical tilt for a transmission to the UE when scheduled in a subframe category C. By transmission direction tilt is here meant that the transmission to the UE is directed away from a normal vertical angle, e.g. by being directed downwards, as compared to a horizontal plane. By tilting the transmission direction downwards, the transmission may be prevented from reaching the BS2. This may also be referred to as vertical beamsteering or vertical beamforming Another measure to avoid subjecting the neighboring BS2, or UEs served by BS2, to interference above an interference limit when scheduling the UE in a subframe category C and using a PM_B, may be determining a precoder matrix to be used for a transmission to the UE when scheduled in a subframe category C. This alternative requires that there is a PM_Y, other than PM_B, which is acceptable for transmission to the UE, but which is less correlated to a PM_A corresponding to indicator A than PM_B (corresponding to indicator B). By acceptable for transmission is here meant e.g. having a correlation with PM_B which exceeds a correlation threshold T2

The above alternatives relate to actions taken when a correlation determined based on indicator A and indicator B exceeds a threshold T. When said correlation does not exceed the threshold T, a transmission power $P_H$ may be applied to a transmission to the UE when scheduled in a subframe category C, wherein the transmission power $P_H$ is higher than transmission power $P_L$. That is, it may be determined that when the determined correlation does not exceed the threshold T, the interference subjected towards BS2 will not exceed a predefined interference limit associated with subframe category C, when using a PM corresponding to indicator B. The applying of a transmission power $P_H$ is illustrated in FIG. 3b as an action 305:2. It should be noted that a normal antenna tilt is assumed in this case.

The correlation threshold T should be selected such that a correlation exceeding the threshold will imply that a signal transmitted to the UE using a PM_B and a certain transmission power, e.g. a regular transmission power, will cause an interference towards BS2 which exceeds an interference threshold T3 or some other criterion. This could be achieved e.g. by simulations varying the values of indicator A and indicator B, determining the correlation and observing the resulting interference at a BS2. Alternatively, the resulting interference could be estimated based on precoder correlation and transmission power.

Further, when the correlation determined based on indicator A and indicator B exceeds a threshold implying a certain interference towards BS2, but the UE is still to be scheduled in a subframe category C, an alternative precoder matrix could be determined, as described above. Thus, the adapting of a transmission to the UE based on properties of the correlation may comprise determining a precoder matrix to be used for a transmission to the UE when scheduled in a subframe category C, wherein the determined precoder matrix is less correlated to a precoder matrix PM_A corresponding to indicator A than a precoder matrix PM_B corresponding to indicator B.

As previously described, a precoder matrix to be used for a transmission to the UE may be determined based on the determined correlation. For example, if both the UE and BS2 reports the same preferred PMI, a signal transmitted to the UE using this PMI causes a worst interference towards BS2 and thereby the cell(s) served by BS2. Therefore, it could be decided that this PMI should not be used for the UE. Instead, a PM having a lower correlation to the PMI (PM) reported by the BS2 could be determined for the UE. The lower the correlation between the PM reported by the BS2 and the PM used for the UE, the less interference is created towards the cell served by BS2.

The determining or selecting of a precoder matrix PM should be performed such that the interference towards the BS2 is as low as possible or at least lower than if the a reported preferred PM for the BS2 had been used, i.e. the PM enabling the strongest signal reaching the BS2. A PM could be selected, which creates a beam which is orthogonal to a beam created by a PM preferred by the BS2, even though directed in the same direction.

Embodiments herein also relate to a method performed by another base station, namely a base station corresponding to the neighboring base station BS2 in the examples above. The method performed by this other base station is performed in order to provide the information needed for the method described above, i.e. the method performed by BS1.

Figure 4:
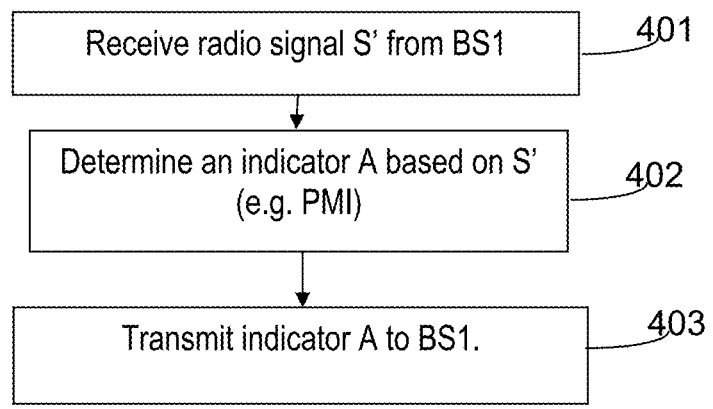
FIG. 4 illustrates a procedure in a second base station BS2, according to an exemplifying embodiment.

Such a method performed by a neighboring base station, BS2, will now be described with reference to FIG. 4. FIG. 4 illustrates the method comprising receiving 401 a signal from BS1. The signal may be a reference signal, as described above, which is known to the base station BS2. The receiving of the signal enables the BS2 to perform measurements e.g. related to spatial properties of a channel over which the signal is received from BS1 and to estimate spatial channel properties of the channel.

The method further comprises determining 402 an indicator A based on the received signal. The indicator A is related to estimated spatial properties of a channel between the neighboring base station BS1 and the base station BS2. The method further comprises transmitting 403 the indicator A to the neighboring base station BS1. The indicator A could be transmitted over a radio interface to BS1, and/or e.g. over an inter-node interface, such as the X2 interface.

By performing this, the BS2 enables the neighboring base station BS1 to control interference subjected towards the base station BS2 caused by transmissions to a UE by adapting a transmission to the UE, based on the indicator A and a corresponding indicator B, received from said UE.

The indicator A may comprise or indicate different information related to estimated spatial properties of a channel between the neighboring base station BS1 and the base station BS2, as previously described. For example, it may comprise explicit channel parameters, a CSI or a PMI (PMI may be part of a CSI).

When indicator A is or comprises a PMI, this PMI may correspond to a PM, out of a set of PMs, which is most suitable for transmission over the channel between the neighboring base station BS1 and the base station BS2. The set of PMs is assumed to be known by both BS1 and BS2.

Below, some examples will be described, where PMIs are reported by UEs and neighboring base stations, and these PMIs are used for determining how to adapt a transmission to a UE.

A UE configured with a transmission scheme allowing for beam forming of both DL physical data channels and DL physical control channels reports PMI to the serving node, which may be a high power node e.g. a macro base station. This reporting can be triggered by the serving node or be configured by the serving node to occur at certain time instants. The reported PMI may then be used by the macro node as a measure to set e.g. the transmit power, or/and adjust antenna down tilting, on the transmissions to that UE. UEs reporting PMI that indicates similar spatial signature as victim LPNs, and those UEs that e.g. do not support beam forming of physical control channels, would need to be scheduled by the aggressor macro node with reduced transmit power as in RPSF. For other UEs, transmissions with higher or full transmit power can be considered.

In order to use PMI as the measure for the macro node to set the transmit power of the UE specific and beam formed data and control transmissions, the PMI associated with the LPN needs to be known in the macro node. There are several ways how this information can be conveyed to the macro node.

If the LPN is equipped with UE receiver functionality, the PMI estimated from this receiver will decide the "direction" towards the LPN. This "UE" can be a standard UE which feedbacks CSI regularly (as any other UE in the network), alternatively, this can be some kind of measurement UE from where the PMI is polled. Since the location (and radio channel) would be rather constant over time (the LPN is usually stationary) it may be foreseen that the PMI information can be acquired very seldom, e.g. only at start up, or when the LPN UE detect that the PMI is changing. In case of a non-stationary LPN, the UE part of the LPN would feedback this information more frequently. Note that it is not strictly necessary to know the geographical direction of the LPN, since it is the direction in which the radio signals arrive at the LPN that matters and this is obtained from PMI information and can be used in the macro to adjust the transmit antenna pattern.

Depending on the number of transmit antennas at the macro node some embodiments can be envisaged. For example, if a dual column x-pol (quad) antenna is used, the spatial properties of the 4Tx codebook together with the port mapping on the antenna can be used to direct different layers, and polarizations, into different directions. FIG. 4 shows the beampattern for the rank 2 PMI code book in LTE. For certain PMIs in the rank 2 PMI code book in LTE, the two beams are orthogonal and hence if the LPN reports a PMI associated with one of the beams, it would be possible to schedule users with full power on the other beam. Similar patterns can be seen for the 8Tx codebook. In the case of 8Tx antennas it is also possible to sort the PMIs or "beams" to avoid scheduling users that prefer a PMI with high spatial correlation towards the LPN.

An alternative to using PMI reports or corresponding information on spatial properties could be to estimate the geographical direction towards the LPN. This would require a UE transmitter located in the LPN, such that the LPN can transmit signals to a macro node, which could use the signals to estimate the direction towards the LPN. The estimated direction can be compared to the direction towards UEs in the cell, and thus it could be determined when to apply measures for reducing the interference towards the LPN. In case of a non-stationary LPN, geo-location information can be obtained from a GPS receiver or through network based positioning methods, such as OTDOA (Observed Time Difference Of Arrival) or advanced round trip time measurements combined with cell ID information, and information on the geographical position of the LPN could then be provided to the macro node, which could use the information to determine whether to adjust a transmission as previously described.

Embodiments described herein also relate to a base station comprising an arrangement for ICIC. The base station is adapted to perform at least one embodiment of the method in a base station as BS1 described above. The base station is associated with the same technical features, objects and advantages as the method described above and illustrated e.g. in FIGS. 3*a* and 3*b*. The base station will be described in brief in order to avoid unnecessary repetition.

Figure 5A:
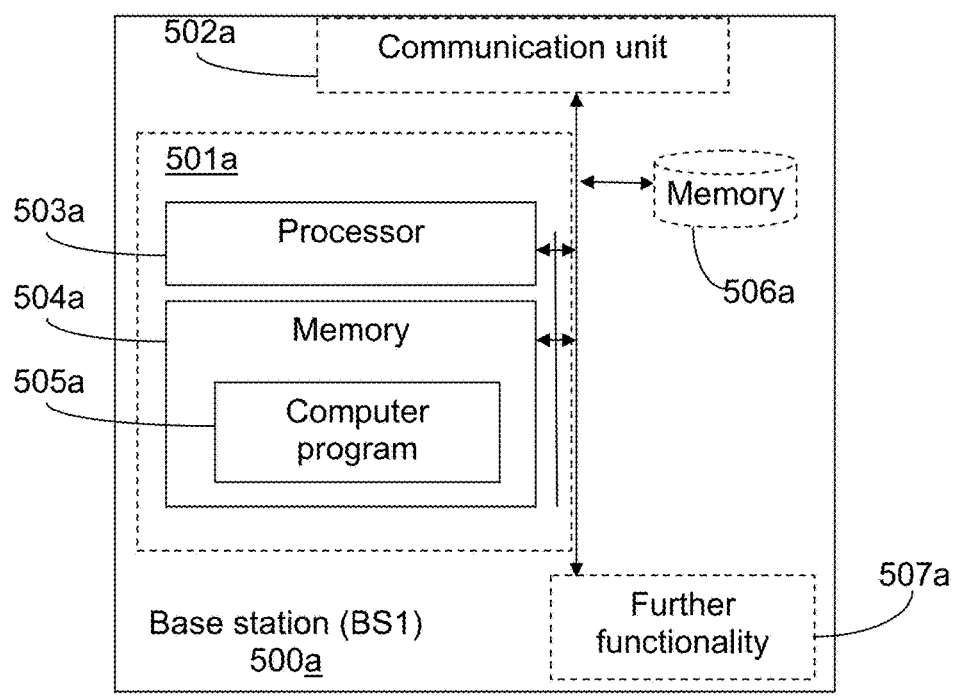
FIGS. 5a and 5b shows a first base station according to exemplifying embodiments.

Below, an exemplifying base station 500*a*, adapted to enable the performance of an above described method for ICIC will be described with reference to FIG. 5*a*. The base station is operable in a wireless communication network and further operable to apply multi-antenna transmission and precoding/beam forming, and to serve a number of UEs. The part of the base station which is most affected by the adaptation to the herein described method is illustrated as an arrangement 501*a*, surrounded by a dashed line. The base station 500*a* and arrangement 501*a* are further illustrated as to communicate with other entities via a communication unit 502*a* comprising means for wireless communication and possibly means for wired communication. The base station or arrangement may further comprise other functional units 507*a*, such as a scheduler, and may further comprise one or more storage units 1606*a*.

The arrangement part of the base station may be implemented and/or described as follows:

The arrangement comprises processing means 503*a* and a memory 504*a* for storing instructions 505*a*, the memory comprising instructions which when executed by the processing means causes the arrangement to receive 302, from a neighboring base station BS2, an indicator A, related to estimated spatial properties of a radio channel over which the neighboring base station has received a radio signal from the base station BS1; and further to receive 303, from a UE served by the base station, an indicator B related to estimated spatial properties of a radio channel over which the UE has received a radio signal from the base station BS1. The execution of the instructions further causes the arrangement to-determine 304 a correlation based on indicator A and indicator B; and to adapt a transmission to the UE, based on properties of the correlation. The execution of the instructions could further cause the arrangement to transmit to the UE according to the adaptation.

Further, the indicators may comprise or indicate different information and the adapting may be performed in different ways, as described above in association with the method.

Figure 5B:
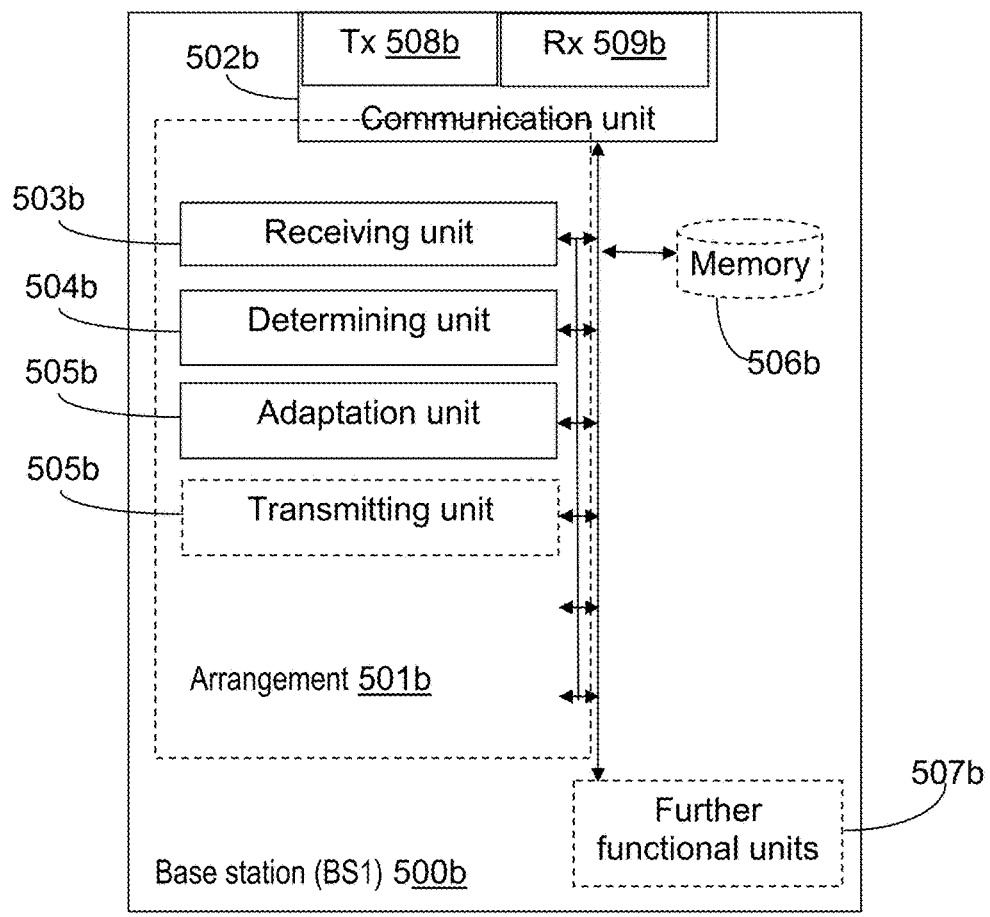

An alternative embodiment of the base station 500a is shown in FIG. 5b. FIG. 5b illustrates a base station 500b, operable in a wireless communication network and further operable to apply multi-antenna transmission and precoding/beam forming, and to serve a number of UEs.

The base station 500b comprises a receiving unit 503b, configured to receive, from a neighboring base station, an indicator A, related to estimated spatial properties of a radio channel over which the neighboring base station has received a radio signal from the base station BS1. The receiving unit 503b is further adapted to receive, from a UE served by the base station, an indicator B related to estimated spatial properties of a radio channel over which the UE has received a radio signal from the base station BS1.

The base station 500b further comprises a determining unit 504, configured to determine a correlation based on indicator A and indicator B; and further comprises an adaptation unit, configured to adapt a transmission to the UE, based on properties of the correlation. The base station could further comprise a transmitting unit 505b, configured to perform or trigger a transmission to the UE in accordance with the adaptation. Alternatively, the transmission to the UE may be part of the configuration of the adaptation unit.

The arrangement 501b could be implemented e.g. by one or more of: a processor or a micro processor and adequate software and memory for storing thereof, a Programmable Logic Device (PLD) or other electronic component(s) or processing circuitry configured to perform the actions described above, and illustrated e.g. in FIGS. 3a and 3b.

Embodiments described herein also relate to another base station 600a (BS2, or LPN) for ICIC. The base station is adapted to perform at least one embodiment of the method described above e.g. in association with FIG. 4. The arrangement is associated with the same technical features, objects and advantages as the method to be performed by an arrangement, which method is described above and illustrated e.g. in FIG. 4. The arrangement will be described in brief in order to avoid unnecessary repetition.

Figure 6A:
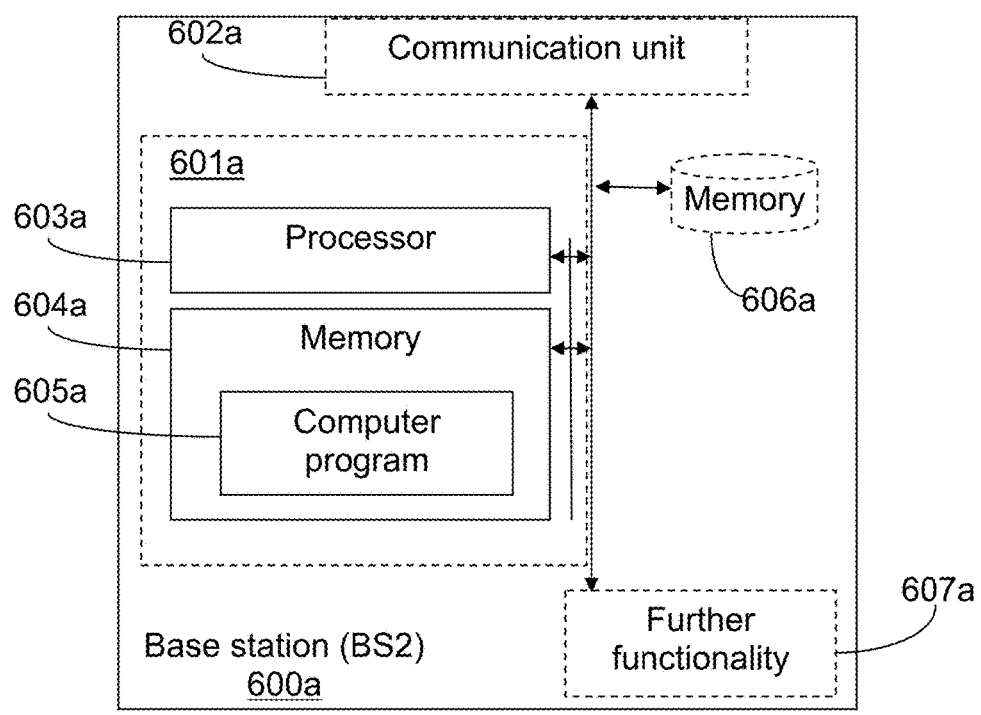
FIGS. 6a and 6b shows a second base station according to exemplifying embodiments.
Figure 6B:
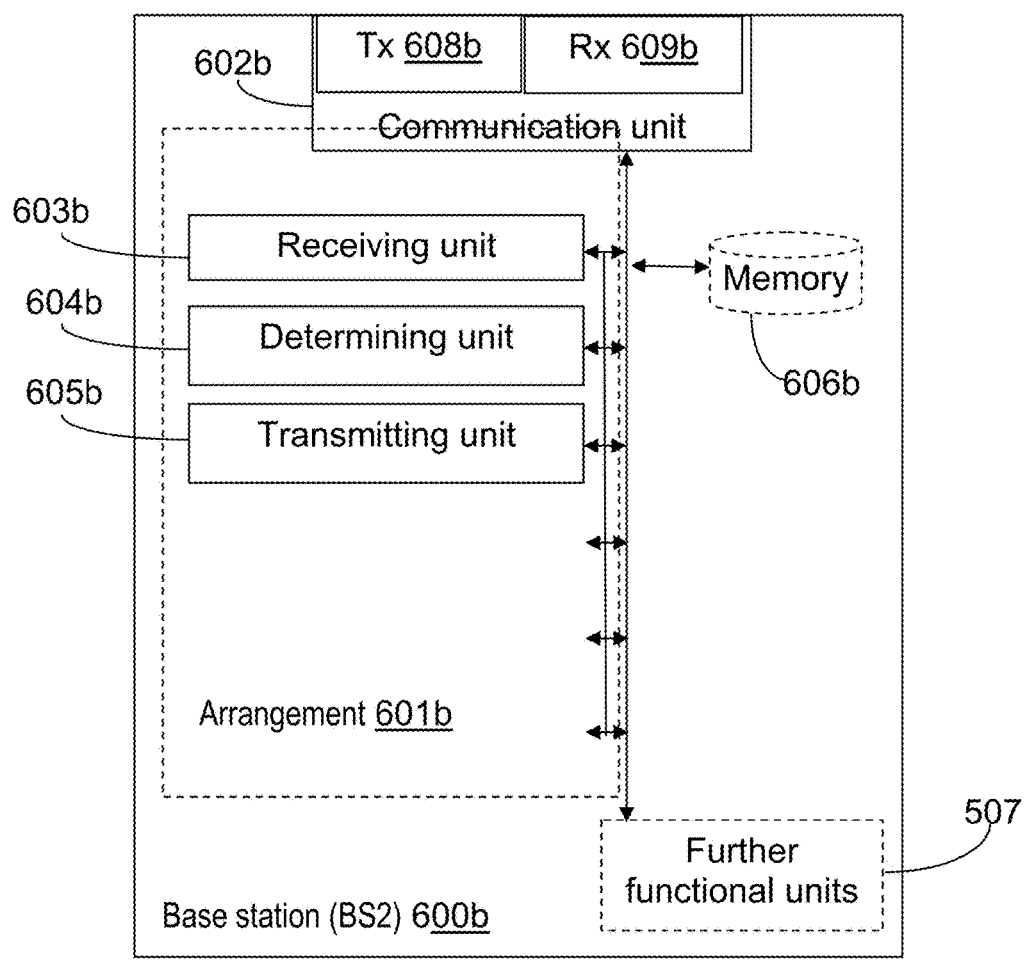
Figure 7:
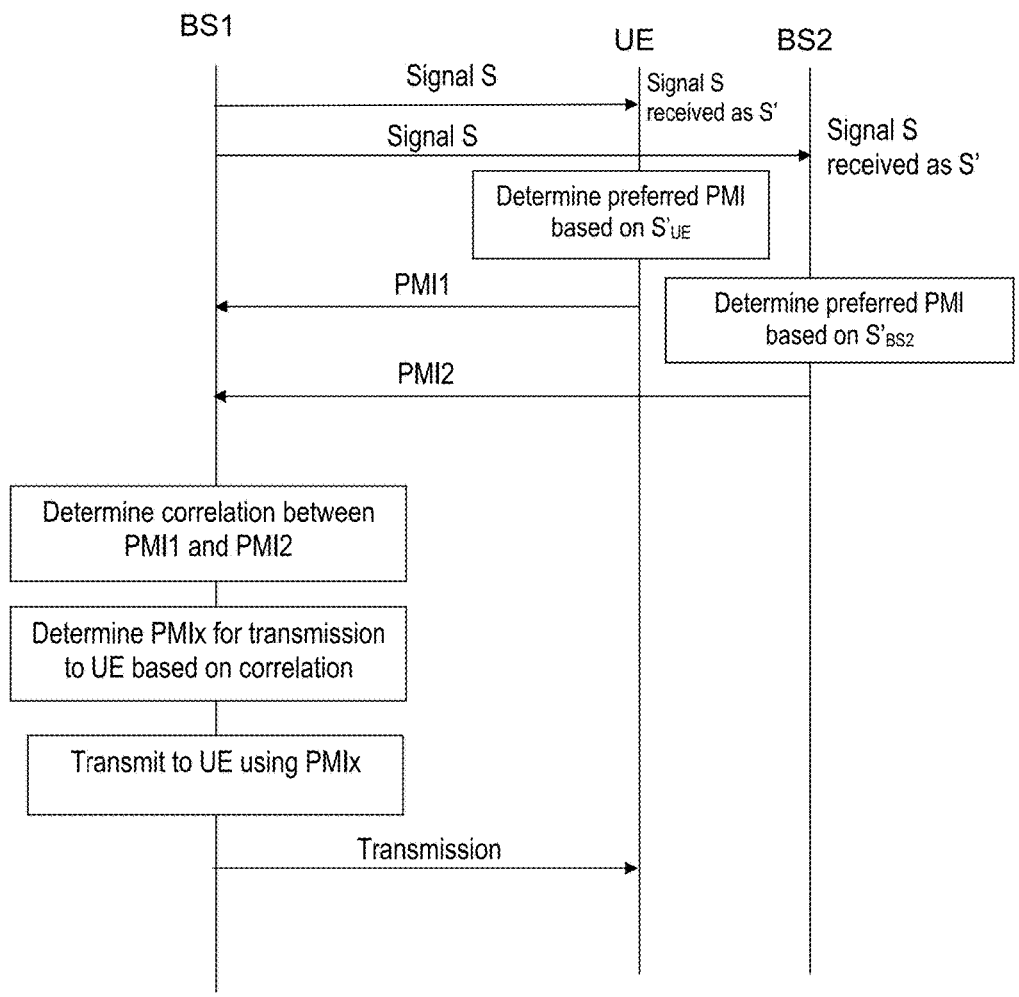
FIG. 7 shows signaling between nodes according to an exemplifying embodiment.

Below, an exemplifying arrangement 600a, adapted to enable the performance of an above described method for supporting IC IC will be described with reference to FIG. 6a. The part of the base station which is most affected by the adaptation to the herein described method is illustrated as an arrangement 601a, surrounded by a dashed line. The base station 600a and arrangement 601a are further illustrated as to communicate with other entities via a communication unit 602b, which may, if preferred, be a part of the arrangement 601a. The communication unit 602a comprises means for wireless communication and possibly means for wired communication. The means for wireless communication should be operable to receive signals from a neighboring base station in addition to signals from UEs. The base station or arrangement may further comprise other functional units 607a, such as means for serving UEs, and may further comprise one or more storage units 606a.

The arrangement part of the base station may be implemented and/or described as follows:

The arrangement comprises processing means 603a and a memory 604a for storing instructions 605a, the memory comprising instructions, which when executed by the processing means causes the arrangement to receive 401 a radio signal from a neighboring base station BS1; and to determine 402, based on the received signal, an indicator A related to estimated spatial properties of a channel between the neighboring base station BS1 and the base station BS2. The execution of the instructions further causes the arrangement to transmit 403 the indicator A to the neighboring base station BS1.

Further, the indicator A may comprise or indicate different information, as described above in association with the method.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

The invention claimed is:

1. A method performed by a base station in a wireless communication network applying precoding, the base station being operable to serve a number of User Equipment (UE), the method comprising:
   receiving, from a neighboring base station, an indicator A, related to estimated spatial properties of a radio channel over which the neighboring base station has received a radio signal from the base station;
   receiving from a UE, an indicator B, related to estimated spatial properties of a radio channel over which the UE has received a radio signal from the base station;
   determining a correlation based on the indicator A and indicator B; and
   adapting a transmission to the UE, based on properties of the correlation, wherein the adapting comprises:
      selecting at least one of a transmission power, a subframe category, in which to schedule the UE, a Precoder matrix or a downlink transmission tilt for transmission to the UE, wherein the indicators A and B comprise a Precoder Matrix indicator, and
      performing when the correlation exceeds a threshold T, at least one of:
         refraining from scheduling the UE in the subframe category C, wherein the subframe category C are low power subframes with lower interference than regular subframes; and determining one of a precoder matrix and an alternative precoder matrix to be used for a transmission to the UE when scheduled in the subframe category C.

2. The method according to claim 1, wherein the adapting comprises one of:
when the correlation exceeds a threshold T:
applying a transmission power $P_L$ for a transmission to the UE when scheduled in the subframe category C, wherein the transmission power $P_L$ is lower than a regular transmission power;
applying the downlink transmission tilt for a transmission to the UE when scheduled in the subframe category C; or
when the correlation does not exceed the threshold T:
applying a transmission power $P_H$ for a transmission to the UE when scheduled in the subframe category C, wherein the transmission power $P_H$ is higher than the transmission power $P_L$.

3. The method according to claim 1, wherein the adapting comprises determining the precoder matrix to be used for a transmission to the UE when scheduled in the subframe category C, wherein the precoder matrix is less correlated to a precoder matrix PM_A corresponding to the indicator A than a precoder matrix PM_B corresponding to the indicator B.

4. A base station operable in a wireless communication network and further operable to apply precoding and to serve a number of User Equipment (UE), the base station comprising a processor and a memory comprising instructions, which when executed by the processor causes the base station to:
receive, from a neighboring base station, an indicator A, related to estimated spatial properties of a radio channel over which the neighboring base station has received a radio signal from the base station;
receive, from a UE, an indicator B related to estimated spatial properties of a radio channel over which the UE has received a radio signal from the base station;
determine a correlation based on the indicator A and indicator B; and
adapt a transmission to the UE, based on properties of the correlation, wherein the adapting comprises:
selecting at least one of a transmission power, a subframe category, in which to schedule the UE, a Precoder matrix or a downlink transmission tilt for transmission to the UE, wherein the indicators A and B comprise a Precoder Matrix indicator; and
performing, when the correlation exceeds a threshold T, at least one of:
refraining from scheduling the UE in the subframe category C, wherein the subframe category C are low power subframe with lower interference than regular subframes; and
determining one of a precoder matrix and an alternative precoder matrix to be used for a transmission to the UE when scheduled in the subframe category C.

5. The base station according to claim 4, wherein the adapting comprises one of:
when the correlation exceeds a threshold T:
applying a transmission power $P_L$ for a transmission to the UE when scheduled in the subframe category C, wherein the transmission power $P_L$ is lower than a regular transmission power;
applying the downlink transmission tilt for a transmission to the UE when scheduled in the subframe category C; or
when the correlation does not exceed the threshold T:
applying a transmission power $P_H$ for a transmission to the UE when scheduled in the subframe category C, wherein the transmission power $P_H$ is higher than the transmission power $P_L$.

6. The base station according to claim 4, wherein the adapting comprises determining the precoder matrix to be used for a transmission to the UE when scheduled in the subframe category C, wherein the precoder matrix is less correlated to a precoder matrix PM_A corresponding to the indicator A than a precoder matrix PM_B corresponding to the indicator B.

* * * * *